United States Patent [19]

Smetz

[11] Patent Number: 4,977,649

[45] Date of Patent: Dec. 18, 1990

[54] CONNECTING DEVICE

[75] Inventor: Reinhard G. E. Smetz, Baldingen, Fed. Rep. of Germany

[73] Assignee: RUD-Kettenfabrik Rieger & Dietz GmbH u. Co., Aalen, Fed. Rep. of Germany

[21] Appl. No.: 224,068

[22] Filed: Jul. 25, 1988

[30] Foreign Application Priority Data

Aug. 7, 1987 [DE] Fed. Rep. of Germany ....... 3726738

[51] Int. Cl.⁵ ............................................. A44B 13/00
[52] U.S. Cl. ................................ 24/573.1; 24/265 R; 403/79
[58] Field of Search .......... 24/265 R, 265 H, 265 AL, 24/232 R, 241 P, 241 R, 116 R, 265 BC, 265 EC, 265 CD; 403/79, 154, 157; 59/93, 95, 89

[56] References Cited

U.S. PATENT DOCUMENTS

| | | | |
|---|---|---|---|
| 1,025,668 | 5/1912 | Ashton | 59/95 |
| 1,554,841 | 9/1925 | Clark | 24/241 P X |
| 1,556,428 | 10/1925 | Cunningham | 24/241 P |
| 1,702,218 | 2/1929 | McKissick | 24/232 |

FOREIGN PATENT DOCUMENTS

| | | | |
|---|---|---|---|
| 940438 | 2/1956 | Fed. Rep. of Germany. | |
| 2728786 | 1/1979 | Fed. Rep. of Germany. | |
| 3027818 | 2/1982 | Fed. Rep. of Germany | 24/265 R |
| 2073363 | 10/1982 | United Kingdom | 24/116 R |

Primary Examiner—James R. Brittain
Attorney, Agent, or Firm—Mark P. Stone

[57] ABSTRACT

In a connecting device for belts, chain links and/or other components, particularly in order to facilitate manipulation, a basic unit (1) and a closing element (2) are mutually connected at a first connection point by the use of a pivot closure which consists of a pivot anchor (19) and of a bearing cavity (26) provided with a guide slot for the pivot anchor (19). The position in the bearing cavity (26) of the pivot anchor (19) which is connectable to the bearing cavity (26) is effected by a second connection point which exhibits a retaining bolt (16) and a projection (9) and also a fork which encloses the projection (9).

33 Claims, 8 Drawing Sheets

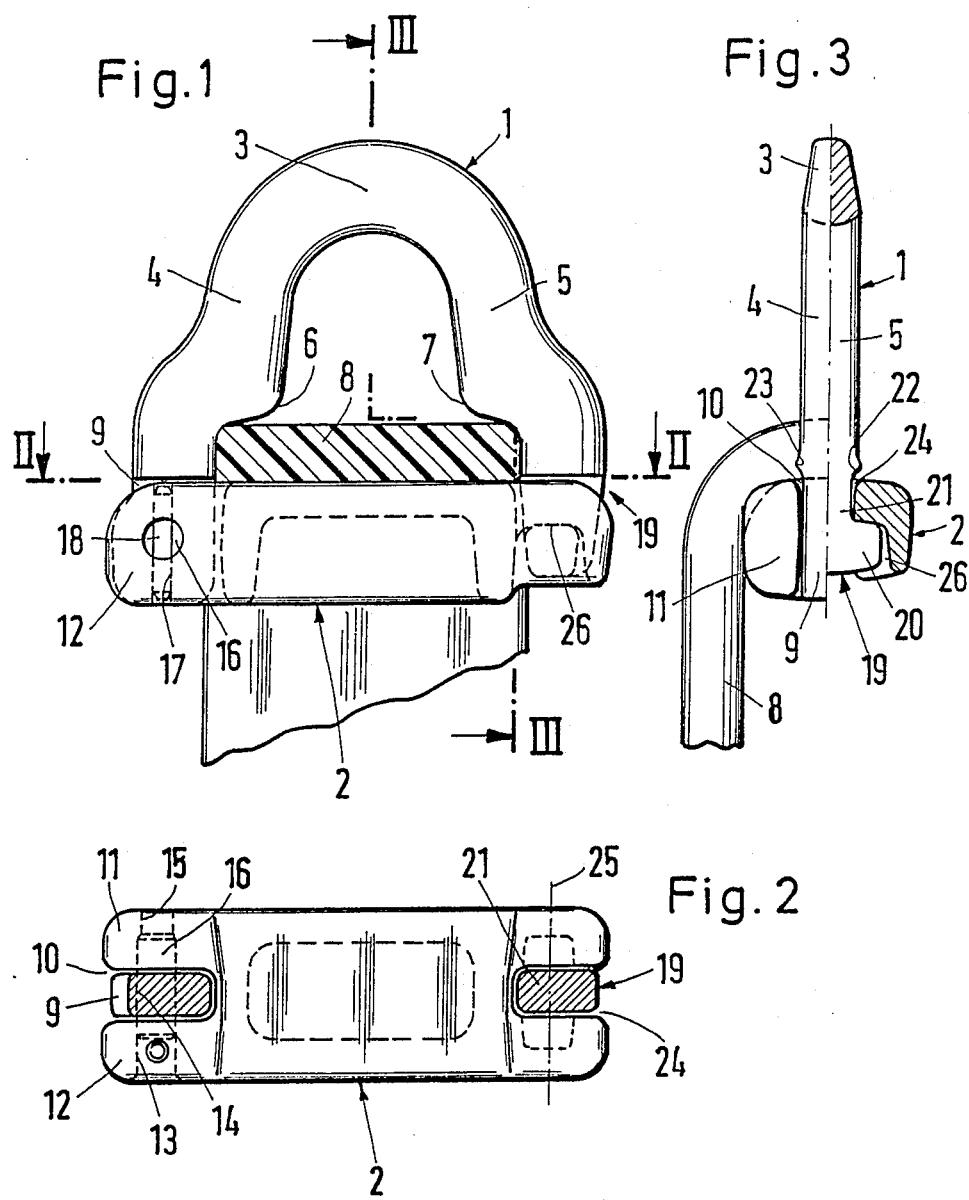

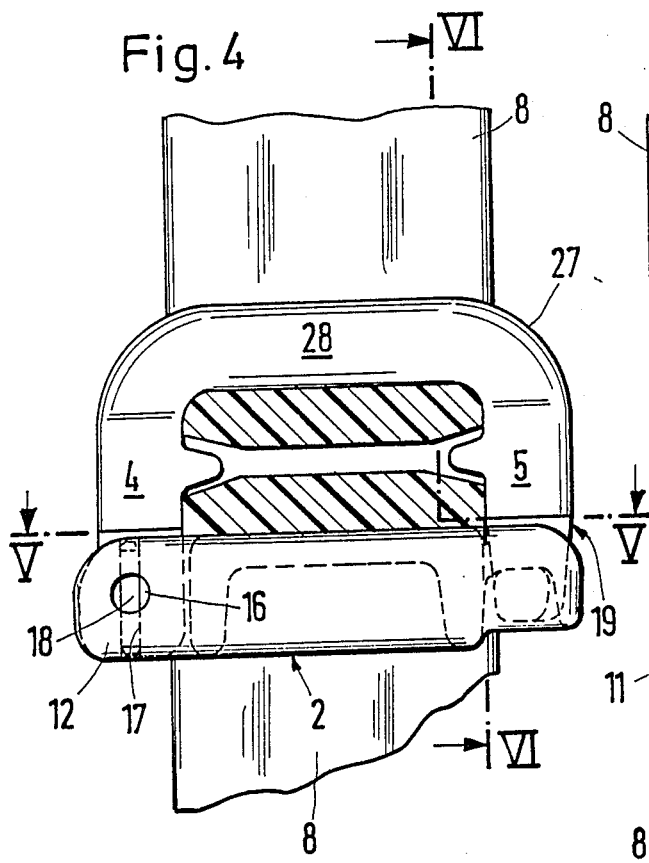
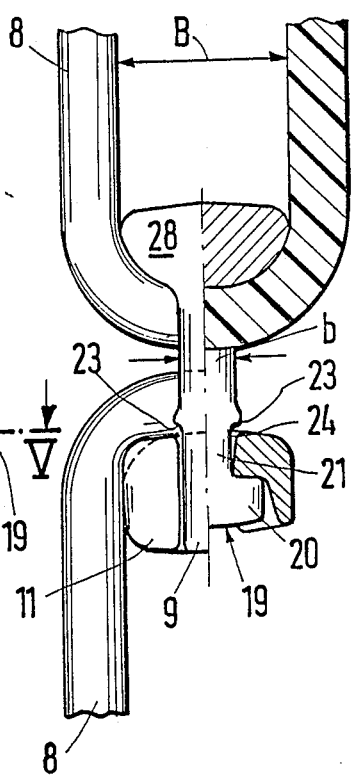
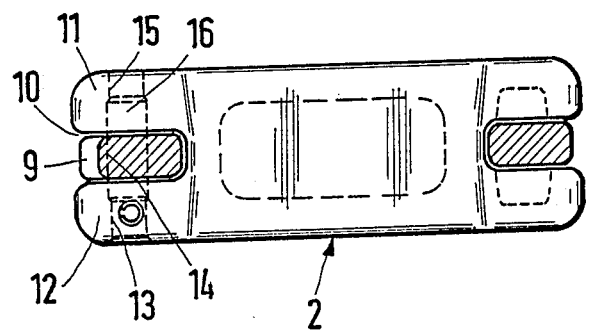

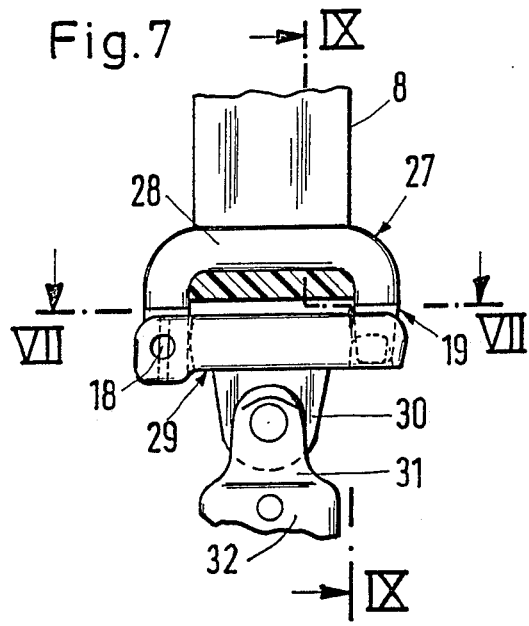
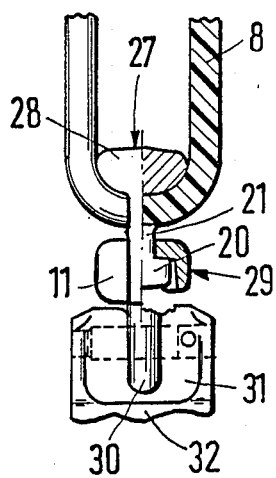
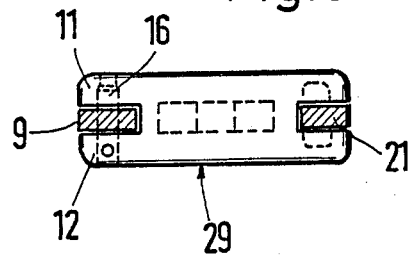

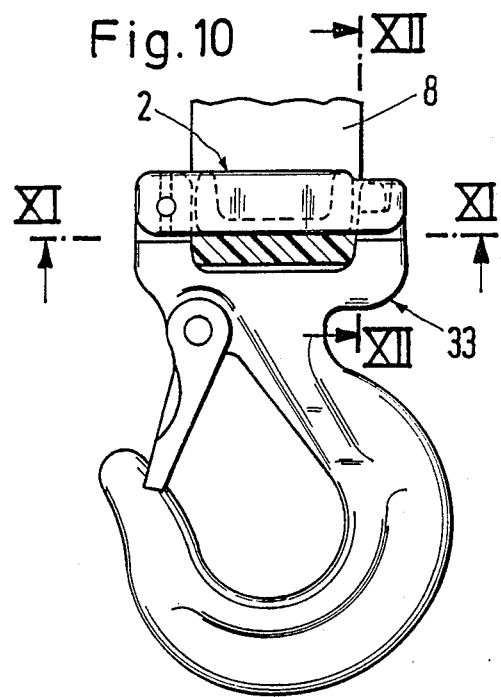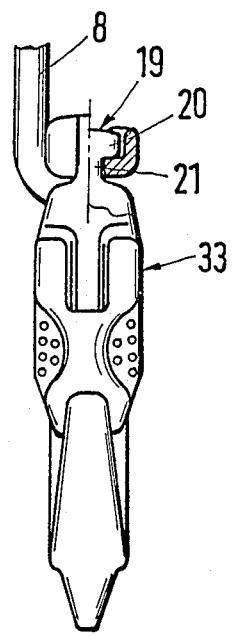

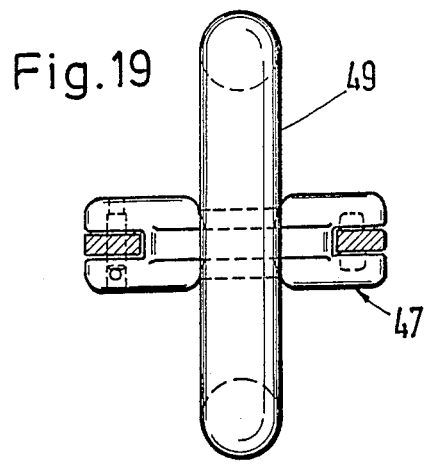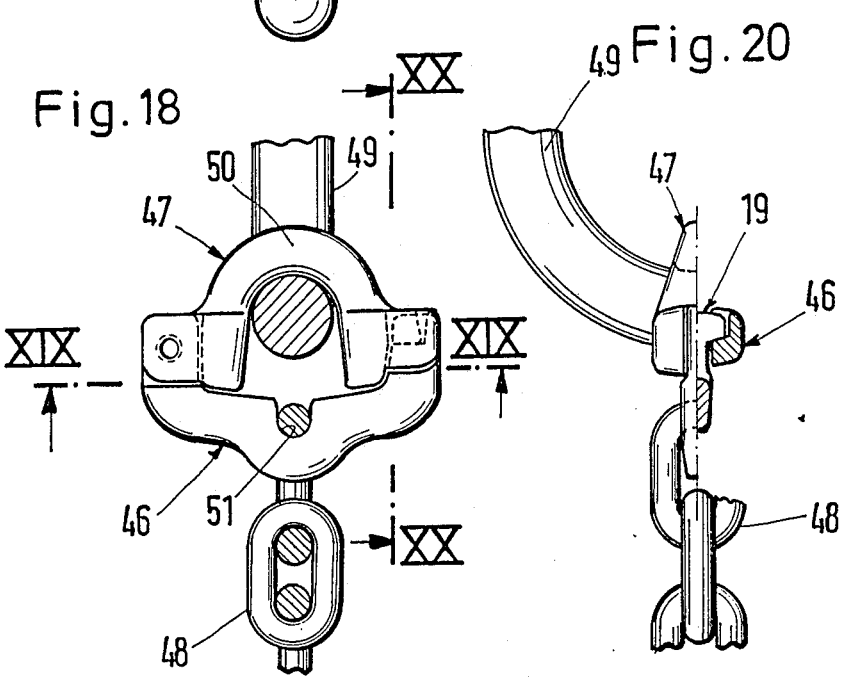

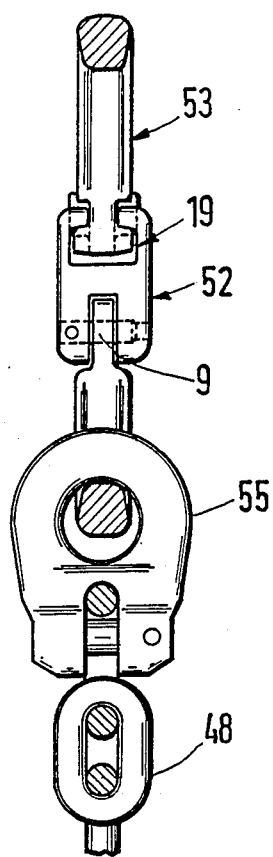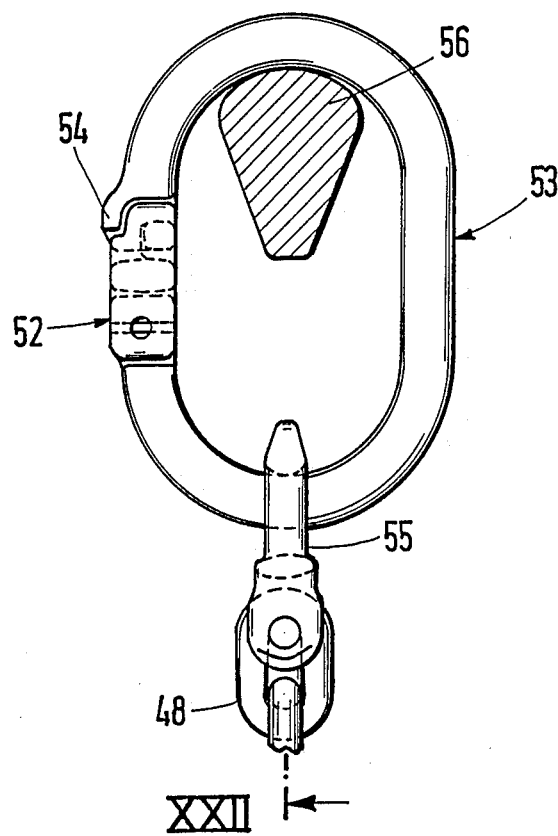

4,977,649

CONNECTING DEVICE

BACKGROUND OF THE INVENTION

The invention relates to a connecting device for at least two components to be mutually connected, such as belts, belt slings, ropes, rope slings, chain links, hooks, rings or the like, having a receiver for at least one of the components which is formed by the basic unit of the connecting device and by a closing element, one end of which is connectable to the basic unit by a retaining bolt introducible into aligned bores of mutually overlapping parts of the basic unit and of the closing element and the other end of which is connectable to the basic unit by a pivot bearing which exhibits a cross beam on which the closing element is mounted pivotably.

A connecting device of the type considered for belts, which is known from FIG. 4 of DE-OS No. 2,728,786, is formed by a somewhat rectangular ring with rounded corners and by an introduction orifice for the belts arranged on a narrow side of the ring. The closure of the introduction orifice is effected in this case by at least one laminar closing element, one end of which is mounted pivotably on a pin on the one of the ends of the connecting device adjoining the introduction orifice. The other end of the closing element forms a hook orifice into which a securing pin, which is also retained in a bore of the connecting device, is drivable in the closed position of the pivoted closing element.

In another connecting device for chain links known from DE-PS No. 940,438 the ends of a substantially C-shaped basic unit form straps with bores for connecting pins by which the straps are connectable to bifurcate ends of an H-shaped closing element which exhibit aligned bores.

In both the known constructions additional means are required in practice to secure the respective connecting pins in the closed position, for which purpose adaptor sleeves have found preference, which are in turn retained in bores produced by cutting processes, like the connecting pins. The volume of cutting machining and also the comparatively complicated manipulation of the known connecting devices when closing and opening them cannot be entirely satisfactory.

SUMMARY OF THE INVENTION

The underlying object of the invention is to produce a connecting device of the type considered which satisfies thr requirements of mass production and is light and convenient to manipulate. This object is achieved according to the invention by the fact that, in a generic connecting device, the cross beam of the pivot bearing is connected nondetachably to the basic unit, and the closing element is connectable to said bearing only in the deviated position.

The connecting device according to the invention can be manipulated extremely simply by using the pivot bearing which consists of mutually connectable parts. It can be produced by the methods of shaping technology with the smallest conceivable cutting outlay. The danger of fretting corrosion forming at the connection points of the closing element and of the basic unit of the connecting device is reduced to a minimum. The mutually connected parts of the pivot bearing are lockable in the connected position by the retaining bolt introducible into the bores of the mutually overlapping parts.

BRIEF DESCRIPTION OF THE DRAWINGS

Further particulars and features of the invention will appear from the subordinate claims and from the following description of a plurality of advantageous exemplary embodiments illustrated in the accompanying drawing, which clarify the versatility of application of the idea of the invention, and wherein:

FIG. 1 shows in elevation a first connecting device,

FIG. 2 shows a section made along the line II—II in FIG. 1,

FIG. 3 shows a side elevation of the connecting device according to FIG. 1 with a partial section made along the line III—III in FIG. 1, FIG. 4 shows in elevation a second connecting device, FIG. 5 shows a section made along the line V—V in FIG. 4, FIG. 6 shows a side elevation of the connecting device according to FIG. 4 with a partial section made along the line VI—VI in FIG. 4, FIG. 7 shows in elevation a third connecting device, FIG. 8 shows a section made along the line VIII—VIII in FIG. 7, FIG. 9 shows a side elevation of the connecting device according to FIG. 7 with a partial section made along the line IX—IX in FIG. 7, FIG. 10 shows in elevation a fourth connecting device, FIG. 11 shows a section made along the line XI—XI in FIG. 10, FIG. 12 shows a side elevation of the connecting device according to FIG. 10 with a partial section made along the line XII—XII in FIG. 10, FIG. 18 shows in elevation a ninth connecting device, FIG. 19 shows a section made along the line XIX—XIX in FIG. 18, FIG. 20 shows in side elevation the connecting device according to FIG. 18 with a partial section made along the line XX—XX in FIG. 18, FIG. 21 shows in elevation a tenth connecting device and, FIG. 22 shows a section made along the line XXII—XXII in FIG. 20.

DESCRIPTION OF THE BEST MODES FOR CARRYING OUT THE INVENTION

Figure 13:
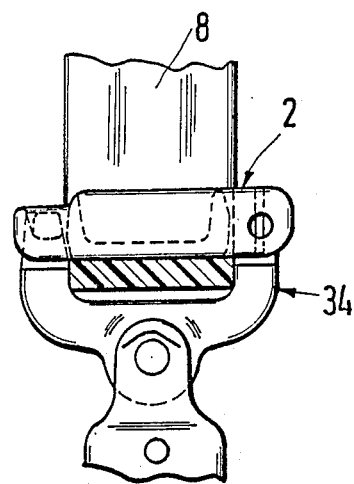
FIG. 13 shows in elevation a fifth connecting device.

The connecting device illustrated in FIGS. 1 to 3 exhibits a stirrup-shaped basic unit 1 and a straight closing element 2 of high rigidity. The basic unit 1 has a yoke 3 and two members 4 and 5 adjoining the latter. The distance between the members 4 and 5 of the basic unit 1 increases abruptly near the ends of the members, forming guide lugs 6 and 7 which prevent a belt sling or rope sling 8 which is supported on the closing element 2 from shifting into the region of the yoke 3. A suspension link, an intermediate link, a hook, a chain or the like can be hooked into the yoke 3 as required.

The ends of the members 4, 5 of the basic unit 1 are connected to the ends of the closing element 2 in a different manner which renders the manipulation of the connecting device particularly simple.

The end of the member 4 forms a projection 9 which engages into a recess 10 which is delimited by the tines 11 and 12 of a fork, which could also be closed at the underside of the closing element 2. The projection 9 and tines 11, 12 of the fork exhibit aligned bores 13, 14, 15, of which the bore 15 in the tine 11 is constructed as a stepped bore. A retaining bolt 16, which rests in the bores 13, 14, 15 with slight play, that is to say with facility of introduction and removal, is secured against loss by a securing pin 18 constructed as an adaptor sleeve and driven into a cross bore 17, and by the shoulder of the stepped bore 15. In other words, the securing pin 18 and the shoulders of the stepped bore 15 form stops for the retaining bolt 16.

The end of the member 5 forms a substantially T-shaped pivot anchor 19 with a cross beam 20 forming two pivot journals and a flat longitudinal beam 21, at the end of which remote from the cross beam 20 guide shoulders 22 and 23 are present, which project beyond a guide slot 24 which is present in the end of the closing element 2 associated with the end of the member 5 and oriented at right angles to the pivot axis 25 of the pivot anchor 19. The guide shoulders 22, 23 prevent the basic unit 1 from plunging during the pivoting movement during the closure of the connecting device. The cross beam 20 of the pivot anchor 19 is mounted by its pivot journal in a bearing cavity 26 open on the underside of the closing element 2, which forms a pocket which totally houses the same. The closing element (2) is pivotal between a locked and an unlocked position, the locked position being shown in FIG. 1 of the drawings. The end of the closing element (2) associated with the cross beam (20) of the pivot anchor (19) is designed so that it is connectable into the pivot anchor only when the closing element (2) is in its unlocked position.

In order to provide the belt sling or rope sling 8 with good support, the width B of the closing element 2 exceeds the width b of the basic unit 1 not only in the region of the ends of the closing element, but also in the support region. The closing element 2 thus, in a sense, performs the function of a thimble.

Both the basic unit 1 and the closing element 2 are forged components, in which only the bores 13, 14, 15 and 17 require cutting machining.

Whereas only the closing element 2 is constructed as a support beam for a belt sling or rope sling in the exemplary embodiment according to FIGS. 1 to 3, FIGS. 4 to 6 show a construction with a substantially U-shaped basic unit 27, the yoke 28 of which likewise forms a support beam for a belt sling or rope sling 8, which is completely identical with the construction previously described as regards its one-sided pivot lock and numerous further datails and therefore requires no additional explanation. The compact and stable construction of the connecting device is found particularly advantageous in this case.

The further embodiments illustrated in FIGS. 7 to 20 also conform in basic construction to the connecting device according to FIGS. 1 to 3, to the description of which reference can therefore be made again. Only some special features will be explained below by way of amplification.

FIGS. 7 to 9 show a connecting device having a basic unit 27 of the type shown in FIGS. 4 to 6. The closing element 29 of this construction is provided with a connecting eye 30 for an adaptor 32 equipped with a connecting fork 31.

A basic unit 33 constructed as a hook is used in the connecting device according to FIGS. 10 to 12, whereas the closing element 2 has the same construction as in the connecting device according to FIGS. 1 to 3.

FIG. 13 shows a counterpart to FIG. 7. Whereas in the case of FIG. 7, the closing element 29 is provided with a connecting eye 30 and a belt sling or rope sling 8 is hooked into the basic unit 27, in the case of a connecting device according to FIG. 13 the basic unit 34 exhibits a connecting eye 30 for an adaptor 32 provided with a connecting fork 31.

Figure 14:
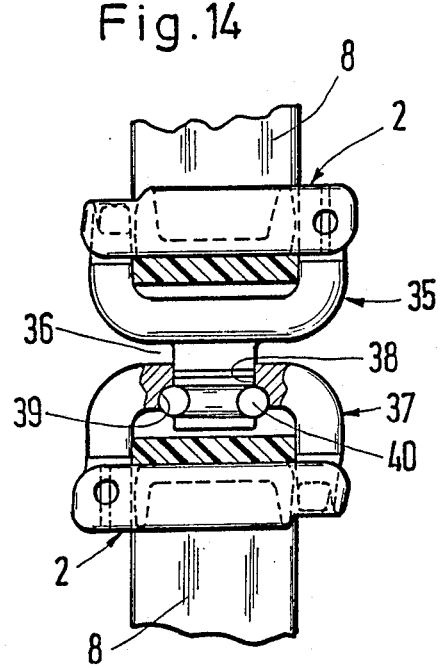
FIG. 14 shows in elevation a sixth connecting device.

FIG. 14 shows a combination of two connecting devices, one of which exhibits a basic unit 35 having a connecting stud 36, and one a basic unit 37 having a connecting bore 38 and a track 39 for balls 40.

Figure 15:
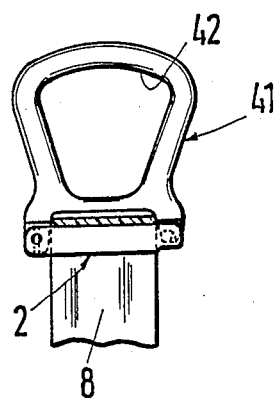
FIG. 15 shows in elevation a seventh connecting device.
Figure 16:
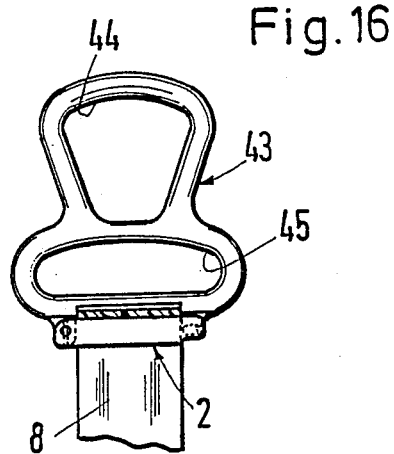
FIG. 16 shows in elevation an eighth connecting device.
Figure 17:
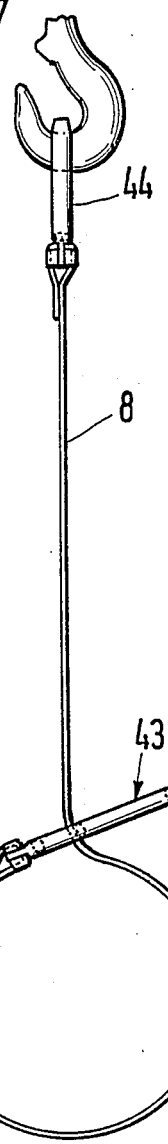
FIG. 17 shows a belt loop assembled with connecting devices according to FIGS. 15 and 16, hooked into a load hook.

FIGS. 15 and 16 show two connecting devices, one of which has a basic unit 41 having a hooking eye 42, and one a basic unit 43 having a hooking eye 44 and a guide eye 45. FIG. 17 shows how the two connecting devices according to FIGS. 15 and 16 can be used.

That the field of use of connecting devices of the type considered is not restricted solely to belt connections is shown by FIGS. 18 and 19, in which a connecting device having a basic unit 46 and a closing element 47 is shown, which serves to connect a chain strand 48 to a suspension link 49. The yoke 50 of the closing element 47 can be used here like a guide groove 51 machined into the basic unit 46 to associate a plurality of chain strands with a suspension link for load-bearing purposes.

Lastly, FIGS. 21 and 22 show an exemplary embodiment in which a closing element 52 closes the introduction orifice of a basic unit 53 constructed as a ring. Again in this case the ends of the basic unit 53 form a projection 9 and a pivot anchor 19. A securing lug 54 is arranged at the end of the basic unit 53 associated with the pivot anchor 19 in order to secure the closing element 52 in the closed position. A so-called ring fork 55, which is hooked into the basic unit 53, serves for the connection of a chain strand 48. 56 designates the cross-section of a load hook into which the basic unit 53 is hookable.

I claim:

1. Connecting device for at least two components to be mutually connected, such as belts, belt slings, ropes, rope slings, chain links, hooks, or rings, having a receiver for at least one of the components which is formed by a basic unit (1, 27, 33, 34, 35, 37, 41, 43, 46, 53) of the connecting device and by a closing element (2, 29, 47, 52), one end of said closing element being connectable to the basic unit (1, 27, 33, 34, 35, 37, 41, 43, 46, 53) by a retaining bolt (16) receivable into aligned bores (13, 14, 15) of mutually overlapping parts of the basic unit (1, 27, 33, 35, 37, 41, 43, 46, 53) and of the closing element (2, 29, 47, 52) and the other end of said closing element being connectable to the basic unit (1, 27, 33, 34, 35, 41, 43, 46, 53) by a pivot bearing having a cross beam (20) on which the closing element (2, 29, 47, 52) is mounted pivotally, said closing element being pivotal between a locked and an unlocked position, characterized in that the cross beam (20) of the pivot bearing is integrally formed on the basic unit (1, 27, 33, 34, 35, 37, 41, 43, 46, 53), and the closing element is connectable to said bearing only in the unlocked position.

2. Connecting device according to claim 1, characterized in that the mutually overlapping parts are formed by a projection formed at one end of said basic unit (9) and a plurality of tines (11, 12) defined on a corresponding end of said closing element for receiving said projection therebetween.

3. Connecting device according to claim 2, characterized in that each of said tines and said projection received therein defines a bore and that one (15) of the bores (13, 15) in the tines (11, 12) is constructed as a blind bore or stepped bore which forms a first stop for a retaining bolt (16) which is guided with play in the bores (13, 14, 15) of said tines and said projection.

4. Connecting device according to claim 3, characterized in that the other (13) of the bores (13, 15) defined in the tines (11, 12) further defines a cross bore (17) to house a securing pin (18) which forms a second stop for the retaining bolt (16).

5. Connecting device according to claim 2 characterized in that the pivot bearing is formed by a bearing cavity (26) defined at an end of said closing element remote from said end defining said tines and a pivot anchor (19) defined at an end of said basic body remote from said end forming said projection.

6. Connecting device according to claim 5, characterized in that the bearing cavity (26) is provided with a guide slot (24) for said pivot anchor, said guide slot being oriented at right angles to a pivot axis (25) of the pivot anchor.

7. Connecting device according to claim 6, characterized in that the pivot anchor (19) is of substantially T-shaped construction.

8. Connecting device according to claim 7, characterized in that the pivot anchor (19) includes a cross beam (20) defining two pivot journals, a flat longitudinal beam (21) adjacent thereto and guided in the guide slot (24), and guide shoulders adjacent thereto projecting laterally beyond the guide slot (24).

9. Connecting device according to claim 8, characterized in that the bearing cavity (26) forms a pocket which houses the cross beam (20) of the pivot anchor (19).

10. Connecting device according to claim 6, characterized in that the pivot anchor (19) includes a cross beam (20) defining two pivot journals, a flat longitudinal beam (21) adjacent thereto and guided in the guide slot (24), and guide shoulders adjacent thereto projecting laterally beyond the guide slot (24).

11. Connecting device according to claim 10, characterized in that the bearing cavity (26) forms a pocket which houses the cross beam (20) of the pivot anchor (19).

12. Connecting device according to claim 1, characterized in that the pivot bearing is formed by a bearing cavity (26) defined at one end of said closing element and a pivot anchor (19) formed on a corresponding end of said basic unit.

13. Connecting device according to claim 12, characterized in that the bearing cavity (26) is provided with a guide slot (24) for the pivot anchor (19), said guide slot being oriented at right angles to a pivot axis (25) of the pivot anchor (19).

14. Connecting device according to claim 13, characterized in that the pivot anchor (19) is of substantially T-shaped construction.

15. Connecting device according to claim 13, characterized in that the pivot anchor (19) includes a cross beam (20) defining two pivot journals, a flat longitudinal beam (21) adjacent thereto and guided in the guide slot (24), and guide shoulders adjacent thereto projecting laterally beyond the guide slot (24).

16. Connecting device according to claim 15, characterized in that the bearing cavity (26) forms a pocket which houses the cross beam (20) of the pivot anchor (19).

17. Connecting device according to claim 1, characterized in that said basic unit (1, 27, 33, 34, 35, 37, 41, 43, 46) to which said closing element is connectable has the shape of a stirrup.

18. Connecting device according to claim 17, characterized in that the stirrup comprises members (4, 5) which define guide lugs (6, 7) protruding into the interior of the stirrup for a belt or a rope sling (8).

19. Connecting device according to claim 18, characterized in that the distance between the members (4, 5) of the stirrup increases abruptly near the ends of the members to form said guide lugs (6, 7) for a belt or a rope sling (8).

20. Connecting device according to claim 17, characterized in that said stirrup comprises two opposed members (4, 5) having opposed ends, said stirrup being configured such that the distance between the members (4, 5) of the stirrup increases abruptly near the ends of the members to form guide lugs (6, 7) for a belt or a rope sling (8).

21. Connecting device according to claim 1 characterized in that the closing element (2) forms a support beam for a belt or a rope sling (8).

22. Connecting device according to claim 21, characterized in that the width (B) of the closing element (2) exceeds the width (b) of the basic unit (1).

23. Connecting device according to claim 1, characterized in that said basic unit (27) to which said closing element is connectable comprises members (4, 5), is of U-shaped construction and defines a yoke (28) which forms a support beam for a belt or a rope sling (8), said yoke having a width (B) which exceeds the width (b) of the members (4, 5) of the basic unit (27).

24. Connecting device according to claim 1, characterized in that said basic unit (33, 34, 35, 37) is provided with a fork, a strap, an eye, a hook, a stud, or a claw for the connection of a component.

25. Connecting device according to claim 1, characterized in that said closing element (29) is provided with a fork, a strap, an eye, a hook, a stud, or a claw for the connection of a component.

26. Connecting device according to claim 1, characterized in that said basic unit (53) has the form of a ring including an introduction orifice closable by the closing element (52).

27. Connecting device according to claim 26, characterized in that the ring is oval.

28. Connecting device according to claim 27, characterized in that one end of the part of the ring which delimits the introduction orifice is constructed as a strap (9) and the other end of the part of the ring which delimits the introduction orifice as a pivot anchor (19).

29. Connecting according to claim 28, characterized in that a securing lug (54) which serves to secure the closing element (52) in the closed position is arranged at the end which is constructed as a pivot anchor.

30. Connecting device according to claim 26, characterized in that one end of a part of the ring delimits the introduction orifice and is constructed as a projection (19) and another end of the part of the ring which delimits the introduction orifice is constructed as a pivot anchor (19).

31. Connecting device according to claim 30, characterized in that a securing lug (54) which serves to secure the closing element (52) in the closed position is arranged at the end of the part of said ring which is constructed as a pivot anchor.

32. Connecting device according to claim 1, characterized in that it forms an adaptor for the connection of chain strands (48) with links of small nominal thickness to intermediate links or suspension links (49) of greater nominal thickness.

33. Connecting device according to claim 1, characterized in that said basic unit (1, 27, 33, 34, 35, 37, 41, 43, 46, 53) and said closing element (2, 29, 47, 52) are both constructed as forged components.

* * * * *

UNITED STATES PATENT AND TRADEMARK OFFICE
CERTIFICATE OF CORRECTION

PATENT NO. : 4,977,649

DATED : December 18, 1990

INVENTOR(S) : Reinhard G.E. Smetz

It is certified that error appears in the above-identified patent and that said Letters Patent is hereby corrected as shown below:

Column 3, Line 57: Delete "details" and substitute - -details--.

Column 6, Line 57: Delete "the" and substitute - -a- -. Delete "which".

Column 6, Line 58: After "orafice", add - -and- -. Delete "strap" and substitute - -projection- -.

Column 6, Line 59: Delete "the other" and substitute "another".

Column 6, Line 60: After "orafice" add - -is constructed- -.

Column 6, Line 64: After "end" add - -of the part of said ring--.

Column 6, Line 68: Delete "(19)" and substitute - -(9)- -.

Signed and Sealed this

Twenty-first Day of April, 1992

Attest:

HARRY F. MANBECK, JR.

*Attesting Officer*       *Commissioner of Patents and Trademarks*